United States Patent [19]

Shimizu et al.

[11] Patent Number: 5,416,174
[45] Date of Patent: May 16, 1995

[54] SCALE PREVENTIVE COATING OF PYROGALLOL-ACETONE RESIN AND WATER SOLUBLE POLYMER

[75] Inventors: Toshihide Shimizu, Urayasu; Mikio Watanabe, Kamisu, both of Japan

[73] Assignee: Shin-Etsu Chemical Co., Ltd., Tokyo, Japan

[21] Appl. No.: 64,432

[22] Filed: May 21, 1993

[30] Foreign Application Priority Data

May 22, 1992 [JP] Japan .................. 4-155871

[51] Int. Cl.$^6$ .............................................. C08F 2/34
[52] U.S. Cl. ...................... 526/62; 526/344; 526/347
[58] Field of Search ........................ 526/62, 344, 347

[56] References Cited

U.S. PATENT DOCUMENTS 4,320,215  3/1982  Yonezawa et al. ............ 526/62
5,264,505  11/1993  Shimizu et al. ............... 526/62

FOREIGN PATENT DOCUMENTS 0372968  6/1990  European Pat. Off. .
372968   6/1990  European Pat. Off. .
0372996  6/1990  European Pat. Off. .

Primary Examiner—Joseph L. Schofer
Assistant Examiner—Tom Weber
Attorney, Agent, or Firm—Oblon, Spivak, McClelland, Maier & Neustadt

[57] ABSTRACT

A polymer scale preventive agent for use in polymerization of a monomer having an ethylenically unsaturated double bond, comprising (A) a pyrogallol-acetone resin, and (B) a water-soluble polymeric compound. When a coating comprising the polymer scale preventive agent is formed on inner wall surfaces of a polymerization vessel and the polymerization is carried out by use of the vessel, deposition of polymer scale can be effectively prevented not only in the areas in the liquid phase inside the vessel but also in the vicinity of the interface between the gas phase and the liquid phase in the vessel. The polymeric product thus obtained can then be processed into sheets or other formed products which have few fish eyes and low initial coloration.

17 Claims, No Drawings

SCALE PREVENTIVE COATING OF PYROGALLOL-ACETONE RESIN AND WATER SOLUBLE POLYMER

BACKGROUND OF THE INVENTION

1. Field of the Invention

The present invention relates to a polymer scale preventive agent useful in polymerization of a monomer having an ethylenically unsaturated double bond, a polymerization vessel effective in preventing polymer scale deposition, and a process of producing a polymer using said vessel.

2. Description of the Prior Art

In a process of preparing polymers by polymerizing a monomer in a polymerization vessel, the problem that polymer deposits on the inner wall surface and so forth in the form of scale, is known. The deposition of the polymer scale on the inner wall results in disadvantages that the yield of the polymer and cooling capacity of the polymerization vessel are lowered; that the polymer scale may peel and mix into manufactured polymer, thereby impairing the quality of the manufactured polymer; and that removal of such polymer scale is laborious and hence time-consuming. Further, since the polymer scale contains unreacted monomer and operators may be exposed thereto, which may cause physical disorders in the operators.

Heretofore, as methods for preventing polymer scale deposition on the inner wall surface and so forth of a polymerization vessel in polymerization of a monomer having an ethylenically unsaturated double bond, methods in which suitable substances are coated on the inner wall surface, etc. as a scale preventive agent, have been known.

As suitable substances for use as a polymer scale preventive agent include, there have been disclosed, for example, particular polar organic compounds (Japanese Patent Publication (KOKOKU) No. 45-30343(1970)), a dye or pigment (Japanese Patent Publication (KOKOKU) Nos. 45-30835(1970) and 52-24953(1977)), an aromatic amine compound (Japanese Pre-examination Patent Publication (KOKAI) No. 51-50887(1976)) and a reaction product of a phenolic compound and an aromatic aldehyde (Japanese Pre-examination Patent Publication (KOKAI) No. 55-54317(1980)).

In the meantime, where polymeric products obtained by polymerization are processed into formed products such as sheets, the resulting formed products are required to have high whiteness. That is, when a polymeric product is formed into a sheet or the like without any addition of a coloring agent, the resulting formed product is more or less colored. Such coloration is called initial coloration, which is desired to be as low as possible. In the case of vinyl chloride polymers, for example, the formed products are desired to have a luminosity index L in the Hunter's color difference equation described in JIS Z 8730(1980) of 70 or more.

However, when polymeric products obtained by polymerization in a polymerization vessel provided on its inner wall surface with a coating comprising a prior-art polymer scale preventive agent, as exemplified typically by the dyes and pigments described in Japanese Patent Publication (KOKOKU) Nos. 45-30835(1970) and 52-24953(1977), the aromatic amine compounds described in Japanese Pre-examination Patent Publication (KOKAI) No. 51-50887(1976) and the reaction products of a phenolic compound and an aromatic aldehyde described in Japanese Pre-examination Patent Publication (KOKAI) No. 55-54317(1980), are processed into formed products such as sheets, the resulting formed products are low in whiteness, namely, high in initial coloration. In the case of vinyl chloride polymers, specifically, the luminosity index (L value) of the formed products is normally 65 or below. This is presumably because the polymer scale preventive agents according to the prior art are, in many case, colored substances. In other words, the coating comprising a colored substance as a polymer scale preventive agent will be incorporated into the polymerization mass through dissolution or peeling, leading to the low whiteness.

Furthermore, the polymer scale preventive agents according to the prior art have the drawback that, although they can prevent the deposition of polymer scale on the areas in the liquid phase inside the polymerization vessel, they are unable to prevent the scale deposition in the vicinity of the interface between the gas phase and the liquid phase inside the polymerization vessel.

Once polymer scale is deposited in the vicinity of the interface between the gas phase and the liquid phase, the deposited scale will grow gradually as polymerization runs are repeated, and at last it is peeled from the inner wall, etc. and incorporated into the polymeric product. If ε the polymeric product containing the polymer scale is processed into formed products such as sheets or the like, the polymer scale causes increase in fish eyes in the formed products, lowering seriously the quality thereof.

Moreover, the prior art polymer scale preventive agents generally include poisonous substances as exemplified typically by deleterious substances such as aniline, nitrobenzene, formaldehyde, etc. among the polar compounds described in the above-mentioned Japanese Patent Publication (KOKOKU) No. 45-30343(12970), and pigments containing a heavy metal such as chromium or lead among the pigments described in Japanese Patent publication (KOKOKU) No. 45-30835(1970). Besides, the dyes described in Japanese Patent Publication (KOKOKU) Nos. 45-30835(1970) and 52-24953(1977) include some dyes that involve concern about carcinogenesis. Therefore, use of these substances may cause problems in safety of operators.

SUMMARY OF THE INVENTION

It is accordingly an object of the present invention to provide a polymer scale preventive agent for use in polymerization of a monomer having an ethylenically unsaturated double bond that can prevent effectively the deposition of polymer scale not only in the areas in the liquid phase inside a polymerization vessel but also in the vicinity of the interface between the gas and liquid phases in the vessel, makes it possible to produce polymeric products with a very small number of fish eyes and low initial coloration after processed into formed products such as sheets or the like, is free of toxicity or the like and hence of fear of causing troubles in safety or health.

It is another object of the present invention to provide a polymerization vessel using the polymer scale preventive agent, and a process of producing a polymer using the vessel.

In order to attain the above objects, the present invention provides a polymer scale preventive agent for use in polymerization of a monomer having an ethylenically unsaturated double bond, comprising:

(A) a pyrogallol-acetone resin, and
(B) at least one member selected from the group consisting of water-soluble polymeric compounds, colloidal silicas and alkali metal silicates.

The present invention also provides a polymerization vessel for use in polymerization of a monomer having an ethylenically unsaturated double bond, which has a coating on its inner wall surfaces, said coating comprising (A) a pyrogallol-acetone resin, and (B) at least one member selected from the group consisting of water-soluble polymeric compounds, colloidal silicas and alkali metal silicates.

The present invention further provides a process of producing a polymer by polymerization of a monomer having an ethylenically unsaturated double bond, which comprises polymerizing the monomer in a polymerization vessel having a coating on its inner wall surfaces, said coating comprising (A) a pyrogallol-acetone resin, and (B) at least one member selected from the group consisting of water-soluble polymeric compounds, colloidal silicas and alkali metal silicates, whereby deposition of polymer scale is prevented.

According to the present invention, deposition of polymer scale can be effectively prevented not only in the areas in the liquid phase but also in the vicinity of the interface between the gas and liquid phases in a polymerization vessel, regardless of polymerization conditions such as the kinds of monomer and polymerization initiator used, the type of polymerization, the material for inner walls of the polymerization vessel, and the like. Therefore, the present invention makes it unnecessary to conduct the operation of removing the polymer scale after every polymerization run, and the productivity is thereby improved.

Besides, when the polymeric product obtained by the application of the present invention is processed into formed products such as sheets, the resulting formed products have very few fish eyes. In addition, the formed products obtained as above is low in initial coloration. That is, the formed products exhibit a luminosity index L in the Hunter's color difference equation described in JIS Z 8730 (1980) of 70 or more in the case of vinyl chloride polymers and 80 or more in the case of SBR.

Furthermore, the polymer scale preventive agent according to the present invention is free of toxicity or the like, and is highly safe. The use of the polymer scale preventive agent, therefore, does not produce any trouble on safety and health of operators.

DETAILED DESCRIPTION OF PREFERRED EMBODIMENTS

Component (A)

The polymer scale preventive agent according to the present invention comprises a pyrogallol-acetone resin, as component (A). The pyrogallol-acetone resin is a condensed polymer of pyrogallol and acetone. In the resin, the pyrogallol/acetone molar ratio normally ranges from 1/0.1 to 1/10, and the resin normally has a melting point of 100° to 500° C. The larger the molecular weight, the higher the melting point. For example, a melting point in the range of 160° to 170° C. corresponds to a molecular weight ranging from 1,450 to 1,650; a melting point in the range of 200° to 220° C. corresponds to a molecular weight ranging from 2,600 to 4,000.

A pyrogallol-acetone resin is prepared by dissolving pyrogallol in acetone and condensing them in the presence of a condensation catalyst. In the preparation, pyrogallol is normally used in an amount of 1 to 100 parts by weight per 100 parts by weight of acetone. The condensation catalyst to be used includes, for example, phosphorus oxychlorides. The condensation reaction may be conducted at a temperature of room temperature to 100° C. Pyrogallol-acetone resins are commercially available from Fuji Chemicals Ind. Co., Ltd.

Component

The polymer scale preventive agent of the present invention comprises at least one member selected from the group consisting of water-soluble polymeric compounds, colloidal silicas and alkali metal silicates, as component (B).

The water-soluble polymeric compounds include, for example, amphoteric polymeric compounds such as gelatin and casein, anionic polymeric compounds such as polyacrylic acid, polystyrenesulfonic acid, carboxymethyl cellulose, and alginic acid, nitrogen-containing cationic polymeric compounds such as polyvinylpyrrolidone and polyacrylamide, hydroxyl-containing polymeric compounds such as polyvinyl alcohol, hydroxyethyl cellulose, hydroxypropyl cellulose and pectin.

Among the water-soluble polymeric compounds above, preferred are gelatin, casein, polyacrylic acid, carboxymethyl cellulose, polyvinylpyrrolidone and pectin.

Colloidal silica is a colloid in which ultrafine particles of silicon dioxide (silica) are dispersed in an aqueous medium or a non-aqueous medium such as methanol, propanol, ethylene glycol, or the like. The colloidal particles generally have a particle diameter of 1 to 100 m$\mu$.

It is well-known that colloidal silica dispersed in an aqueous medium, for example, can be typically produced by adding hydrochloric acid to an aqueous sodium silicate solution, but production methods are not limited thereto. Any production methods can be used as long as the colloidal silica described above is produced.

The silicates of alkali metals include, for example, metasilicates ($M_2SiO_3$), orthosilicates ($M_4SiO_4$), bisilicates ($M_2Si_2O_5$), trisilicates ($M_3Si_3O_7$) and sesquisilicates ($M_4Si_3O_{10}$) of alkali metals such as lithium, sodium and potassium (where M stands for an alkali metal such as lithium, sodium or potassium), and water glass.

In the polymer scale preventive agent according to the present invention, the amount of the component (B) generally ranges from 0.1 to 1000 parts by weight, preferably from 1 to 600 parts by weight, per 100 parts by weight of the component (A). If the amount of the component (B) in relation to the amount of the component (A) is too large or too small, the effect of preventing polymer scale deposition by using the components (A) and (B) together may not be obtained.

The substances for use as component (B) may be used either singly or in combination of two or more. Preferably, a combination of a water-soluble polymeric compound with a colloidal silica or a combination of a water-soluble polymeric compound with an alkali metal silicate is used. Where a water-soluble polymeric compound and a colloidal silica are used in combination, it is preferable to use the colloidal silica in an amount of from 5 to 3000 parts by weight, more preferably from 50 to 1000 parts by weight, per 100 parts by weight of the polymeric compound. Where a water-soluble polymeric compound and an alkali metal silicate are used in combination, the silicate is preferably used in an amount of from 5 to 3000 parts by weight, more preferably from 50 to 1000 parts by weight, per 100 parts by weight of the polymeric compound.

The polymer scale preventive agent according to the present invention is used, for example, in the form of a coating on inner wall surfaces of a polymerization vessel and the like, whereby deposition of polymer scale on the inner wall surfaces and the like is prevented. To form such a coating on the inner wall surfaces of a polymerization vessel and the like, in general, the polymer scale preventive agent is used in the state of a solution or a dispersion in a suitable medium, that is, as a coating liquid.

Preparation of coating liquid

The coating liquid as above can be prepared by adding the above-described components (A) and (B) to a suitable solvent.

The solvents used for preparation of the coating liquid include, for example, water; alcohols such as methanol, ethanol, propanol, butanol, 2-methyl-1-propanol, 2-methyl-2-propanol, 3-methyl-1-butanol, 2-methyl-2butanol, 2-pentanol and the like; ketones such as acetone, methyl ethyl ketone, methyl isobutyl ketone and the like; esters such as methyl formate, ethyl formate, methyl acetate, methyl acetoacetate and the like; ethers such as 4-methyldioxolane, ethylene glycol diethyl ether and the like; furans; and aprotic solvents such as dimethyl formamide, dimethyl sulfoxide, acetonitrile and the like. These solvents may be used either singly or as a mixed solvent of two or more thereof as appropriate.

Among the above solvents, preferred are water and mixed solvents of water and an organic solvent miscible with water. The organic solvents miscible with water include, for example, alcohols such as methanol, ethanol, propanol and the like; and esters such as methyl acetate, ethyl acetate and the like. Where a mixed solvent of water and an organic solvent miscible with water is used, the proportion of the organic solvent is preferably so selected as to avoid dangers of inflammation, explosion or the like and obviate safety problems in handling, e.g., toxicity. Specifically, the amount of the organic solvent in the mixed solvent is preferably 50% by weight or below, more preferably 30% by weight or below. Setting the proportion of the organic solvent in the mixed solvent at 50% by weight or below enhances the dispersibility and/or solubility of the component (B) in the coating liquid, leading to an enhanced effect of preventing polymer scale deposition.

The pH of the coating liquid preferably ranges from 3.0 to 13.5, more preferably from 8.0 to 13.5. In the coating liquid, pH adjusters can be used without any special restrictions. The pH adjusters which can be used include, for example, acidic compound such as phosphoric acid, perchloric acid, sulfuric acid, hydrochloric acid, nitric acid, phytic acid, acetic acid, paratoluenesulfonic acid, tannic acid and the like; and basic compounds such as lithium hydroxide, sodium hydroxide, potassium hydroxide, sodium carbonate, disodium phosphate, sodium silicate, ammonia, ethylenediamine, tetramethylenediamine, ethanolamine, diethanolamine, triethanolamine, guanidine, diethylenetriamine, triethylenetetramine and the like.

The total concentration of the components (A) and (B) in the coating liquid is not specifically restricted, provided the coating weight as described below can be obtained. Normally, the total concentration is in the range from 0.005 to 10% by weight, preferably from about 0.03 to 1.0% by weight.

Formation of the coating

The coating liquid is applied to the inner walls of a polymerization vessel and then dried sufficiently at a temperature from room temperature to 100° C., for instance, followed by washing with water if necessary, to form the coating.

The coating liquid is preferably applied to not only the inner wall surfaces of a polymerization vessel but also other areas with which the monomer comes into contact during polymerization to form the coating on such areas. For example, on a stirring shaft, stirring blades, condensers, headers, search coil, bolts, nuts, etc.

More preferably, for formation of the coating, the coating liquid is applied to areas with which monomers does not come into contact during polymerization but on which polymer scale may deposit, for example, the areas with which unreacted monomers comes into contact of an unreacted monomer recovery system; specifically the inner surfaces, etc. of equipment and pipes of the recovery system. Specifically, such areas include the inner surfaces of monomer distillation columns, condensers, monomer stock tanks and valves.

The method of applying the coating liquid is not particularly restricted, and includes, for example, the brush coating, spray coating, the method of filling the polymerization vessel with the coating liquid followed by withdrawal thereof, and automatic coating methods as disclosed in Japanese Pre-examination Patent Publication (KOKAI) Nos. 57-61001(1982) and 55-36288(1980), and Japanese Patent Publication (KOHYO) Nos. 56-501116(1981) and 56-501117(1981), and Japanese Pre-examination Publication (KOKAI) No. 59-11303(1984), etc.

The method of drying wet coated surfaces provided by application of the coating liquid, is not restricted, either. Following methods can be used. That is, a method in which, after the coating liquid is applied, hot air of a suitable elevated temperature is blown to the coated surface, and a method in which the inner wall surface of a polymerization vessel and the surfaces of other parts to be coated are previously heated to from 30° to 80° C., and the coating liquid is directly applied to the heated inner wall surfaces, etc. After dried, the coated surfaces are washed with water if necessary.

The coating thus obtained upon drying normally has a coating weight of $0.001 \text{ g/m}^2$ to $5 \text{ g/m}^2$, preferably from 0.05 to $2 \text{ g/m}^2$.

The coating thus formed has good durability and retains the scale-preventive effect. Therefore, the coating operation may not necessarily be carried out on each bath of polymerization. This improves productivity.

Polymerization

After the formation of the coating on the inner wall surfaces of a polymerization vessel, and preferably other parts with which monomer may come into contact during polymerization, polymerization is carried out in accordance with conventional procedures. That is, a monomer having an ethylenically unsaturated double bond, a polymerization initiator, and optionally a polymerization medium such as water, etc., a suspending agent, a solid dispersing agent, a dispersing agent such as nonionic or anionic surfactants are charged into the polymerization vessel, followed by carrying out polymerization according to conventional methods.

The monomer having an ethylenically unsaturated double bond to which of this invention can be applied may include, for example, vinyl halides such as vinyl chloride; vinyl esters such as vinyl acetate and vinyl propionate; acrylic acid, methacrylic acid, and esters or salts thereof; maleic acid, fumaric acid, and esters or salts thereof; and diene monomers such as butadiene, chloroprene and isoprene; styrene, acrylonitrile, vinylidene halides such as vinylidene chloride, and vinyl ethers. These may be used singly or in combination of two or more.

There are no particular restrictions on the type of polymerization to which this invention can be applied. The present invention is effective in any type of polymerization such as suspension polymerization, emulsion polymerization, solution polymerization, bulk polymerization, and gas phase polymerization. Particularly, the present invention is more suitable to polymerizations in an aqueous medium such as suspension or emulsion polymerization.

In the following, general conditions are described on each type of polymerizations.

In the case of suspension or emulsion polymerization, first, water and a dispersing agent are charged into a polymerization vessel, and thereafter a polymerization initiator is charged. Subsequently, the inside of the polymerization vessel is evacuated to a pressure of from 0.1 to 760 mmHg, and a monomer is then charged (whereupon the pressure inside the polymerization vessel usually becomes from 0.5 to 30 kgf/cm$^2$.G). Thereafter, polymerization is carried out at a temperature of from 30° to 150° C. During the polymerization, one or more of water, a dispersing agent and a polymerization initiator may be added, if necessary. Reaction temperature during the polymerization is different depending on the kind of monomer to be polymerized. For example, in the case of polymerizing vinyl chloride, polymerization is carried out at 30° to 80° C.; in the case of polymerizing styrene, polymerization is carried out at 50° to 150° C. The polymerization may be judged to be completed when the pressure inside the polymerization vessel falls to from 0 to 7 kgf/cm$^2$.G or when cooling water which passes through a jacket provided around the polymerization vessel indicates almost the same temperature at the inlet where it is charged and at the outlet where it is discharged (i.e., when liberation of heat due to polymerization reaction has subsided). The water, dispersing agent and polymerization initiator to be charged for polymerization are used in amounts of 20 to 500 parts by weight, 0.01 to 30 parts by weight, and 0.01 to 5 parts by weight, respectively, per 100 parts by weight of the monomer.

In the case of solution polymerization, an organic solvent such as toluene, xylene and pyridine is used as the polymerization medium in place of water. The dispersing agent is optionally used. The other conditions are generally the same as those described for suspension and emulsion polymerizations.

In the case of bulk polymerization, after the inside of a polymerization vessel is evacuated to a pressure of from about 0.01 mmHg to about 760 mmHg, a monomer and a polymerization initiator are charged into the polymerization vessel, and then polymerization is carried out at a temperature of from −10° C. to 250° C. In the case of polymerizing vinyl chloride, for example, polymerization is carried out at from 30° to 80° C.; in the case of styrene, polymerization temperature is from 50° to 150° C.

The present invention makes it possible to prevent polymer scale from depositing, independent of materials constituting the inner wall, etc. of a polymerization vessel. For example, this invention can prevent deposition of polymer scale even in the case polymerization is carried out in a polymerization vessel made of a steel including stainless steel or lined with glass.

Any additive materials that have been conventionally added in a polymerization system can be used without any limitation. More specifically, the method of this invention can effectively prevent polymers from depositing, even in polymerization systems containing the following additives: for example, polymerization initiators such as t-butyl peroxyneodecanoate, bis(2-ethylhexyl) peroxydicarbonate, 3,5,5-trimethylhexanoyl peroxide, α-cumyl peroxyneodecanoate, cumene hydroperoxide, cyclohexanone peroxide, t-butyl peroxypivalate, bis(2-ethoxyethyl) peroxydicarbonate, benzoyl peroxide, lauroyl peroxide, 2,4-dichlorobenzoyl peroxide, diisopropyl peroxydicarbonate, α,α'-azobisisobutyronitrile, α,α'-azobis-2,4-dimethylvaleronitrile, potassium peroxodisulfate, ammonium peroxodisulfate, and p-menthane hydroperoxide; suspension agents comprised of natural or synthetic polymeric compounds such as partially saponified polyvinyl alcohols, polyacrylic acids, vinyl acetate/maleic anhydride copolymers, cellulose derivatives such as hydroxypropylmethyl cellulose, and gelatin; solid dispersing agents such as calcium phosphate and hydroxyapatite; nonionic emulsifying agents such as sorbitan monolaurate, sorbitan trioleate and polyoxyethylene alkyl ether; anionic emulsifying agents such as sodium lauryl sulfate, sodium alkylbenzenesulfonates such as sodium dodecylbenzenesulfonate and sodium dioctylsulfosuccinate; fillers such as calcium carbonate and titanium oxide; stabilizers such as tribasic lead sulfate, calcium stearate, dibutyltin dilaurate and dioctyltin mercaptide; lubricants such as rice wax, stearic acid and cetyl alcohol; plasticizers such as DOP and DBP; chain transfer agents such as mercaptans such as t-dodecyl mercaptan, and trichloroethylene; and pH adjusters.

The polymer scale preventive agent of the present invention may be added to a polymerization mass in addition to the formation of the coating, so that the scale preventing effect is further improved. The amount of the polymer scale preventive agent to be added to the polymerization mass is preferably in the range of about 5 to about 1,000 ppm based on the whole weight of the monomers charged. The addition should be conducted so that it may not adversely affect the quality of polymeric products to be obtained with respect to fish eyes, bulk density, particle size distribution, etc.

EXAMPLES

The working examples of the present invention and comparative examples will now be described below. In each table below, experiments marked with * are comparative examples and the other experiments are working examples of the present invention.

In the working examples and the comparative examples below, the following pyrogallol-acetone resins and colloidal silicas were used.

Pyrogallol-acetone resins
PA-1: a product by Fuji Chemicals Ind. Co., Ltd., m.p. 160°–170° C.
PA-2: a product by Fuji Chemicals Ind. Co., Ltd., m.p. 200°–220° C.
Colloidal silicas Snowtex CXS-9: a product by Nissan Chemical Industries, Ltd., with a colloidal particle size of 5 to 7 μm.

Snowtex O: a product by Nissan Chemical Industries, Ltd., with a colloidal particle size of 10 to 20 μm.

Example 1 (Experiment Nos. 101 to 118)

In each experiment, polymerization was conducted using a stainless steel polymerization vessel with an inner capacity of 1,000 liters and having a stirrer, as described below.

First, a coating liquid as shown in Table 2 (total concentration of (A)+(B-1)+(B-2), weight ratio of (A):(B-1):(B-2), solvent composition, and pH (pH adjustment was applied only to Experiment Nos. 105 to 111)) was prepared using (A) a pyrogallol-acetone resin, (B-1) a water-soluble polymeric compound and (B-2) a colloidal silica or alkali metal silicate, as shown in Table 1, as well as a solvent and a basic compound, as shown in Table 2. The coating liquid was applied to the inner wall, the stirring shaft, the stirring blades and other areas with which a monomer comes into contact of the polymerization vessel. The thus applied coating liquid was dried by heating at 60° C. for 15 minutes to form a coating, and the interior of the polymerization vessel was washed with water. Sodium silicate No. 3 used in Experiment No. 110 is as specified in JIS K 1408 (1966).

Thereafter, into the polymerization vessel in which the coating was formed as above, 400 kg of water, 200 kg of vinyl chloride, 250 g of a partially saponified polyvinyl alcohol, 25 g of hydroxypropyl methyl cellulose and 75 g of bis(2-ethylhexyl) peroxydicarbonate were charged, followed by polymerization with stirring at 57° C. for 6 hours. After the completion of the polymerization, the produced polymer was taken out and unreacted monomer was recovered out of the polymerization vessel. Subsequently, the inside of the polymerization vessel was washed with water and residual resin was removed.

The batch above comprising the operations of polymerization and washing with water, but not including the coating operation, was repeated the number of times shown in Table 3. After the final batch was over, the amount of polymer scale deposited on an area located in the liquid phase and on an area in the vicinity of the interface between the gas and liquid phases in the polymerization vessel, was measured according to the method below. The results are given in Table 3.

Measurement of the amount of polymer scale

The scale deposited in an area of 10 cm square on the inner wall of the polymerization vessel is scraped off with a stainless steel spatula, and then the scraped scale is weighed on a balance. Thereafter, the amount of the deposited scale per area of 1 $m^2$ is obtained by multiplying the measured value by 100.

The number of fish eyes which may appear when a polymer is formed into sheet was measured with respect to the polymers produced in the experiments according to the method below. The results are given in Table 3.

Measurement of fish eyes

A hundred parts by weight of a polymer, 50 parts by weight of dioctyl phthalate (DOP), 1 part by weight of dibutyltin dilaurate, 1 part by weight of cetyl alcohol, 0.25 part by weight of titanium oxide and 0.05 part by weight of carbon black are formulated to prepare a mixture. The mixture is kneaded at 150° C. for 7 minutes with 6 inch rolls, and then formed into a sheet 0.2 mm thick. The sheet is examined for the number of fish eyes per 100 $cm^2$ by light transmission.

Further, to evaluate initial coloration at the time a polymer is formed into sheet, luminosity index L was measured according to the method below. The results are given in table 3.

Measurement of luminosity index L

A hundred parts by weight of a polymer, 1 part by weight of a tin laurate stabilizing agent (trade name: TS-101, product of Akisima Chemical Co.) and 0.5 part by weight of cadmium stabilizing agent (trade name: C-100J, product of Katsuta Kako Co.), and 50 parts by weight of DOP are kneaded at 160° C. for 5 minutes with a twin roll mill, and then formed into a sheet 1 mm thick. Subsequently, this sheet is placed in a mold measuring 4 cm×4 cm×1.5 cm (depth), is heated at 160° C. and a pressure of 65 to 70 kgf/$cm^2$ for 0.2 hour and press molded under the same conditions to prepare a test specimen. This test specimen is measured for luminosity index L in the Hunter's color difference equation described in JIS Z 8730 (1980). The higher the value of L of the test specimen, the higher the whiteness (namely, the lower the initial coloration) of the polymer.

The value of L was determined as follows. The stimulus value Y of XYZ color system is determined according to the photoelectric tristimulus colorimetry using the standard light C, photoelectric colorimeter (Color measuring color difference meter Model Z-1001DP, product of Nippon Denshoku Kogyo K.K.) in accordance with JIS Z 8722. As the geometric condition for illumination and being illuminated, the condition d defined in section 4.3.1 of JIS Z 8722 is adopted. Next, L is calculated based on the equation: $L=10Y^{\frac{1}{2}}$ described in JIS Z 8730 (1980).

TABLE 1

| Exp. No. | (A) Pyrogallol/ acetone resin | (B-1) Water-soluble polymeric compound | (B-2) Colloidal silica or Alkali metal silicate |
|---|---|---|---|
| 101* | — | — | — |
| 102* | PA-1 | — | — |
| 103* | — | Gelatin | — |
| 104* | — | — | Snowtex CXS-9 |
| 105 | PA-1 | Gelatin | Snowtex CXS-9 |
| 106 | PA-1 | Gelatin | — |
| 107 | PA-1 | — | Snowtex CXS-9 |
| 108 | PA-2 | Carboxymethyl cellulose | Snowtex CXS-9 |
| 109 | PA-2 | Gelatin | Snowtex CXS-9 |
| 110 | PA-2 | Polyacrylic acid | Sodium silicate No. 3 |
| 111 | PA-2 | Polyvinyl pyrrolidone | Potassium metasilicate |

TABLE 2

| Exp. No. | Total concentration of (A) + (B-1) + (B-2) (wt. %) | (A):(B-1):(B-2) (weight ratio) | Solvent (weight ratio) | Basic compound | pH |
|---|---|---|---|---|---|
| 101* | — | — | — | — | — |
| 102* | 0.3 | 100:0:0 | Water/Methanol (70:30) | — | 5.6 |
| 103* | 0.3 | 0:100:0 | Water/Methanol (70:30) | — | 6.5 |

TABLE 2-continued

| Exp. No. | Total concentration of (A) + (B-1) + (B-2) (wt. %) | (A):(B-1):(B-2) (weight ratio) | Solvent (weight ratio) | Basic compound | pH |
| --- | --- | --- | --- | --- | --- |
| 104* | 0.3 | 0:0:100 | Water/Methanol (70:30) | — | 9.5 |
| 105 | 0.3 | 100:100:100 | Water/Methanol (70:30) | NAOH | 8.7 |
| 106 | 0.3 | 100:200:0 | Water/Methanol (70:30) | NAOH | 9.5 |
| 107 | 0.5 | 100:0:300 | Water/Methanol (70:30) | NAOH | 10.0 |
| 108 | 0.2 | 100:200:300 | Water/Methanol (90:10) | Ethylene-diamine | 10.0 |
| 109 | 0.3 | 100:300:200 | Water/Methanol (80:20) | KOH | 10.0 |
| 110 | 0.3 | 100:100:100 | Water/Methanol (95:5) | NaOH | 10.5 |
| 111 | 0.3 | 100:40:60 | Water/Methanol (90:10) | NaOH | 9.0 |

TABLE 3

| Exp. No. | Repetition number of batch (batches) | Results of polymerization | | Number of fish eyes | Luminosity index (L) |
| --- | --- | --- | --- | --- | --- |
| | | Polymer scale amount (g/m²) | | | |
| | | Liquid phase | Around interface of gas and liquid phases | | |
| 101* | 1 | 1100 | 2500 | 35 | 73.0 |
| 102* | 2 | 3 | 1500 | 31 | 72.5 |
| 103* | 1 | 580 | 1300 | 31 | 73.0 |
| 104* | 1 | 130 | 320 | 27 | 73.0 |
| 105 | 5 | 0 | 41 | 14 | 73.0 |
| 106 | 3 | 2 | 105 | 25 | 73.0 |
| 107 | 3 | 1 | 98 | 21 | 72.5 |
| 108 | 5 | 0 | 68 | 17 | 73.0 |
| 109 | 5 | 0 | 44 | 15 | 73.0 |
| 110 | 5 | 0 | 65 | 17 | 73.0 |
| 111 | 5 | 0 | 72 | 18 | 73.0 |

Example 2 (Experiment Nos. 201 to 208)

In each experiment, polymerization was conducted using a stainless steel polymerization vessel with an inner capacity of 20 liters and having a stirrer, as described below.

First, a coating liquid as shown in Table 5 (total concentration of (A)+(B-1)+(B-2), weight ratio of (A):(B-1):(B-2), solvent composition, and pH (pH adjustment was applied only to Experiment Nos. 205 to 208)) was prepared using (A) a pyrogallol-acetone resin, (B-1) a water-soluble polymeric compound and (B-2) a colloidal silica or alkali metal silicate, as shown in Table 4, and a solvent and a basic compound, as shown in Table 5. The coating liquid was applied to the inner wall, the stirring shaft, the stirring blades and other areas with which a monomer comes into contact of the polymerization vessel. The applied coating liquid was dried by heating at 60° C. for 15 minutes to form a coating, which was then washed with water.

Thereafter, into the polymerization vessel in which the coating was formed as above, 9 kg of water, 225 g of sodium dodecylbenzenesulfonate, 12 g of t-dodecyl mercaptan and 13 g of potassium peroxodisulfate were charged. After the atmosphere inside the polymerization vessel was replaced with a nitrogen gas, 1.3 kg of styrene and 3.8 kg of butadiene were charged, followed by polymerization at 50° C. for 20 hours. After the completion of the polymerization, the produced polymer was taken out and unreacted monomer was recovered out of the polymerization vessel. Subsequently, the inside of the polymerization vessel was washed with water and residual resin was removed.

The batch above comprising the operations of polymerization and washing with water, but not including the coating operation, was repeated the number of times shown in Table 4. After the final batch was over, the amount of polymer scale deposited on an area located in the liquid phase and on an area in the vicinity of the interface between the gas and liquid phases in the polymerization vessel, was measured in the same manner as in Example 1. The results are shown in Table 6.

Further, to evaluate initial coloration at the time a polymer is formed into sheet, luminosity index L was measured according to the method below. The results are given in Table 6.

Measurement of luminosity index L

To 1 kg of a polymer latex obtained was added 1 kg of 2% magnesium sulfate solution to cause aggregation and sedimentation. The sediment was filtered off, washed with a hot water at 80° to 90° C. twice or three times and dried at 40° C. for 25 hours in a vacuum dryer to give a resin. The resin was placed in a mold measuring 9×9×0.1 cm (depth), heated at 195° C. under a pressure of 50 to 60 kgf/cm² for 0.2 hour and press molded under the final pressure of 80 kgf/cm² to prepare a test specimen.

This test specimen was measured for luminosity index L in the same manner as in Example 1.

TABLE 4

| Exp. No. | (A) Pyrogallol/ acetone resin | (B-1) Water-soluble polymeric compound | (B-2) Colloidal silica or Alkali metal silicate |
| --- | --- | --- | --- |
| 201* | — | — | — |
| 202* | PA-1 | — | — |
| 203* | — | Polyacrylic acid | — |
| 204* | — | — | Snowtex O |
| 205 | PA-1 | Polyacrylic acid | Snowtex O |
| 206 | PA-1 | Polyvinyl pyrrolidone | Snowtex CXS-9 |
| 207 | PA-2 | Polyacrylic acid | Snowtex CXS-9 |
| 208 | PA-2 | Gelatin | Snowtex CXS-9 |

TABLE 5

| Exp. No. | Total concentration of (A) + (B-1) + (B-2) (wt. %) | (A):(B-1):(B-2) (weight ratio) | Solvent (weight ratio) | Basic compound | pH |
| --- | --- | --- | --- | --- | --- |
| 201* | — | — | — | — | — |
| 202* | 0.3 | 100:0:0 | Water/Methanol (80:20) | — | 5.6 |
| 203* | 0.3 | 0:100:0 | Water/Methanol (80:20) | — | 2.8 |
| 204* | 0.3 | 0:0:100 | Water/Methanol (80:20) | — | 4.3 |
| 205 | 0.3 | 100:200:50 | Water/Methanol (80:20) | NaOH | 9.5 |
| 206 | 0.3 | 100:50:300 | Water/Methanol (90:10) | KOH | 9.5 |
| 207 | 0.3 | 100:100:100 | Water/Methanol (80:20) | Ethylenediamine | 10.0 |
| 208 | 0.3 | 100:200:300 | Water/Methanol (80:20) | NaOH | 9.0 |

TABLE 6

| Exp. No. | Repetition number of batch (batches) | Polymer scale amount (g/m$^2$) Liquid phase | Polymer scale amount (g/m$^2$) Around interface of gas and liquid phases | Luminosity index (L) |
| --- | --- | --- | --- | --- |
| 201* | 1 | 300 | 650 | 85.0 |
| 202* | 2 | 10 | 150 | 84.5 |
| 203* | 1 | 180 | 390 | 85.0 |
| 204* | 1 | 120 | 230 | 85.0 |
| 205 | 3 | 0 | 62 | 85.0 |
| 206 | 3 | 0 | 76 | 85.0 |
| 207 | 3 | 0 | 58 | 85.0 |
| 208 | 3 | 0 | 57 | 85.0 |

We claim:

1. A process of producing a polymer by polymerization of a monomer having an ethylenically unsaturated double bond, which consists of:

polymerizing the monomer in a polymerization vessel having a coating on its inner wall surfaces, said coating formed by applying a liquid polymer scale preventive agent having a pH ranging from 8.0 to 13.5 and consisting of (A) pyrogallol-acetone resin and (B) a water-soluble polymeric compound dissolved in a mixed solvent of water and 50 wt. % or less, based on the mixed solvent, of an organic solvent compatible with water, thereby forming a coating of (A) a pyrogallol-acetone resin and (B) a water-soluble polymeric compound, whereby deposition of polymer scale is prevented.

2. The process of claim 1, wherein said polymerization is conducted as suspension polymerization, emulsion polymerization, solution polymerization, bulk polymerization or gas phase polymerization.

3. The process of claim 1 or 2, wherein said monomer is selected from the group consisting of vinyl esters; vinyl halides; vinylidene halides; acrylic acid, methacrylic acid and their esters and salts; maleic acid, fumaric acid and their esters and anhydrides; diene monomers; styrene; acrylonitrile; vinylidene halides and vinyl ethers.

4. The process of claim 1, wherein component (A) of the agent comprises from 0.1 to 10 moles of the acetone component per one mole of the pyrogallol component.

5. The process of claim 1, wherein component (B) is present in an amount of 0.1 to 1000 parts by weight per 100 parts by weight of component (A).

6. The process of claim 1, wherein the total concentration of components (A) and (B) in the scale preventive agent is within the range of from 0.005 to 10% by weight.

7. The process of claim 1, wherein the coating is applied to interior areas other than the inner wall structure of the polymerization vessel with which the monomer comes into contact during polymerization.

8. The process of claim 1, wherein said coating is applied on other areas with which the unreacted monomer comes into contact in the system in which unreacted monomer is recovered.

9. The process of claim 7 or 8, wherein the applied coating has a coating weight of 0.001 to 5 g/m$^2$.

10. A process of producing a polymer by polymerization of a monomer having an ethylenically unsaturated double bond, which consists of:

polymerizing the monomer in a polymerization vessel having a coating on its inner wall surfaces, said coating formed by applying a liquid polymer scale preventive agent having a pH ranging from 8.0 to 13.5 and consisting of (A) pyrogallol-acetone resin, (B) a water-soluble polymeric compound and (C) colloidal silica in a mixed solvent of water and 50 wt. % or less, based on the mixed solvent, of an organic solvent compatible with water, thereby forming a coating of (A) pyrogallol-acetone resin, (B) water-soluble polymeric compound and (C) colloidal silica, whereby deposition of polymer scale is prevented.

11. The process of claim 10, wherein the scale preventive agent contains colloidal silica (C) in an amount of from 5 to 3000 parts by weight per 100 parts by weight of the water-soluble polymeric compound (B).

12. The process of claim 11, wherein components (B) and (C) combined are present in a total amount of 0.1 to 1000 parts by weight per 100 parts by weight of component (A).

13. The process of claim 10, wherein the total concentration of components (A), (B) and (C) in the scale preventive agent is within the range of from 0.005 to 10% by wt.

14. A process of producing a polymer by polymerization of a monomer having an ethylenically unsaturated double bond, which consists of:

polymerizing the monomer in a polymerization vessel having a coating on its inner wall surfaces, said coating formed by applying a liquid polymer scale preventive agent having a pH ranging from 8.0 to 13.5 and consisting of (A) pyrogallol-acetone resin, (B) a water-soluble polymeric compound and (C') an alkaline metal silicate dissolved in a mixed solvent of water and 50 wt. % or less, based on the mixed solvent, of an organic solvent compatible with water thereby forming a coating of (A) pyrogallol-acetone resin, (B) water-soluble polymeric compound and (C') alkaline metal silicate, whereby deposition of polymer scale is prevented.

15. The process of claim 14, wherein the alkali metal silicate (C') is present in an amount of from 5 to 3000 parts by weight per 100 parts by weight of the water-soluble polymeric compound (B).

16. The process of claim 14, wherein components (B) and (C') combined are present in a total amount of 0.1 to 1000 parts by weight per 100 parts by weight of component (A).

17. The process of claim 14, wherein the total concentration of components (A), (B) and (C') in the scale preventive agent is within the range of from 0.005 to 10% by weight.

* * * * *